United States Patent
Yamada

(10) Patent No.: US 7,461,269 B2
(45) Date of Patent: Dec. 2, 2008

(54) INFORMATION RECORDING APPARATUS, INFORMATION RECORDING METHOD, AND DIGITAL BROADCAST RECEIVER

(75) Inventor: Masahiro Yamada, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 884 days.

(21) Appl. No.: 10/947,554

(22) Filed: Sep. 23, 2004

(65) Prior Publication Data

US 2005/0071661 A1    Mar. 31, 2005

(30) Foreign Application Priority Data

Sep. 30, 2003    (JP)    ............................ 2003-340696

(51) Int. Cl.
*H04K 1/00*    (2006.01)
(52) U.S. Cl. ............................ 713/193; 726/32; 386/94
(58) Field of Classification Search .................. 713/193
See application file for complete search history.

(56) References Cited

U.S. PATENT DOCUMENTS

| | | | | |
|---|---|---|---|---|
| 6,034,732 | A * | 3/2000 | Hirota et al. ................. | 348/441 |
| 7,225,339 | B2 * | 5/2007 | Asano et al. ................. | 713/193 |
| 2002/0015494 | A1 * | 2/2002 | Nagai et al. ................. | 380/201 |
| 2003/0009681 | A1 * | 1/2003 | Harada et al. ................ | 713/193 |
| 2003/0016826 | A1 * | 1/2003 | Asano et al. ................. | 380/277 |
| 2003/0081792 | A1 * | 5/2003 | Nakano et al. ............... | 380/286 |
| 2004/0190868 | A1 * | 9/2004 | Nakano et al. ................ | 386/94 |
| 2004/0268128 | A1 * | 12/2004 | Kitani et al. ................. | 713/176 |
| 2005/0273618 | A1 * | 12/2005 | Takemura et al. ........... | 713/182 |
| 2006/0150251 | A1 * | 7/2006 | Takashima et al. ............ | 726/26 |
| 2006/0282898 | A1 * | 12/2006 | Yamamoto et al. ............ | 726/26 |
| 2007/0009232 | A1 * | 1/2007 | Muraki et al. ................. | 386/95 |
| 2007/0116278 | A1 * | 5/2007 | Asano et al. ................. | 380/203 |

FOREIGN PATENT DOCUMENTS

| | | |
|---|---|---|
| JP | 11-213552 | 8/1999 |
| JP | 11-243534 | 9/1999 |
| JP | 11-313282 | 11/1999 |
| JP | 2001-195826 | 7/2001 |
| JP | 2002-260326 | 9/2002 |
| JP | 2002-334559 | 11/2002 |
| JP | 2003-22612 | 1/2003 |

* cited by examiner

*Primary Examiner*—Kambiz Zand
*Assistant Examiner*—Yonas Bayou
(74) *Attorney, Agent, or Firm*—Pillsbury Winthrop Shaw Pittman, LLP

(57) ABSTRACT

An information recording apparatus comprises a drive key register to which one or more disk drives are connected, the drive register storing a specific drive key for use in encoding with respect to each of the disk drives. When storing content, a specific drive key corresponding to a specified disk drive is generated, and the generated drive key is stored in the drive key register. A title key corresponding to input content is generated, and the title key is encoded by using the drive key. In addition, input content is encoded by using the title key, and the encoded content is stored in a specified storage device.

5 Claims, 5 Drawing Sheets

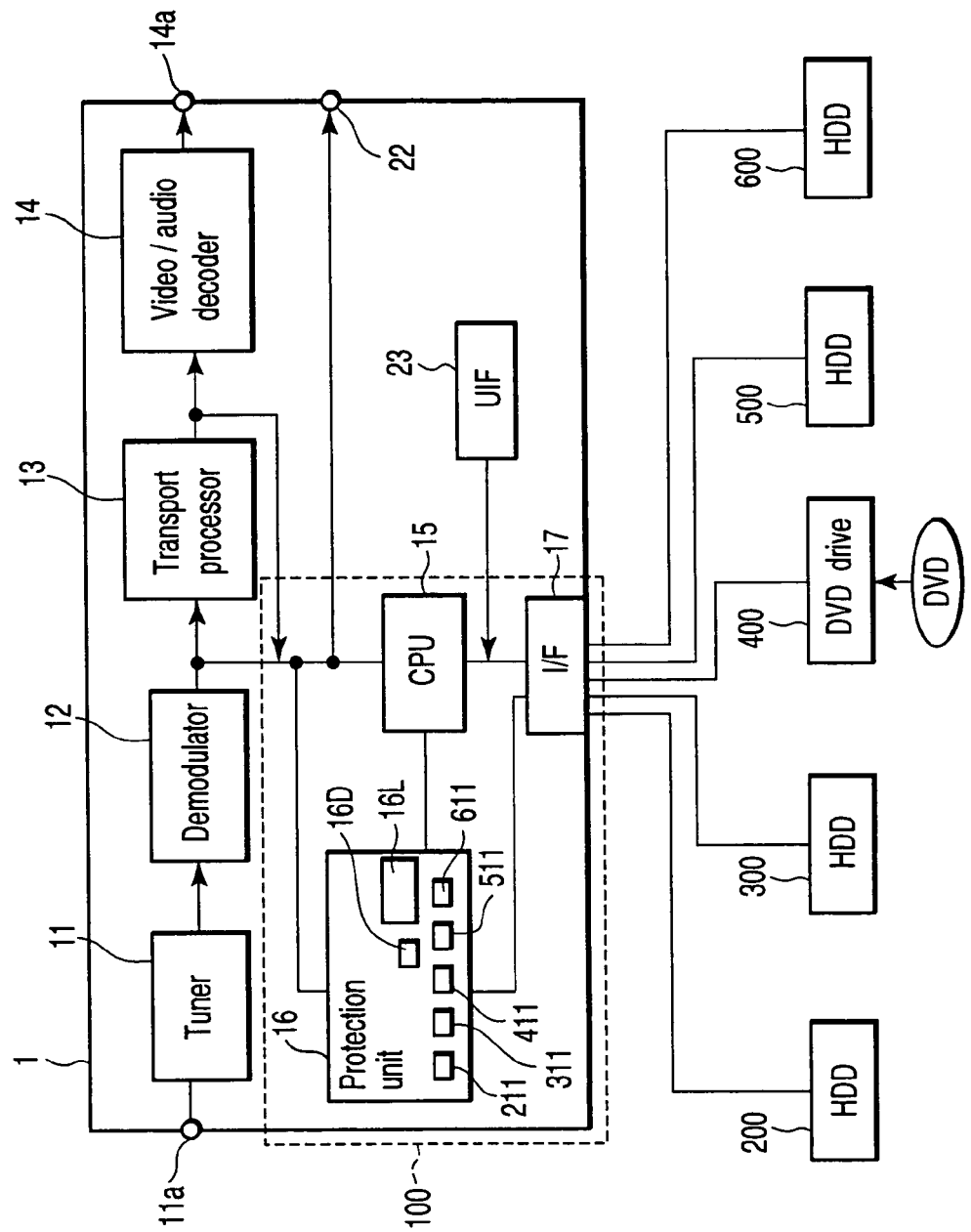
F I G. 1

INFORMATION RECORDING APPARATUS, INFORMATION RECORDING METHOD, AND DIGITAL BROADCAST RECEIVER

CROSS-REFERENCE TO RELATED APPLICATIONS

This application is based upon and claims the benefit of priority from the prior Japanese Patent Application No. 2003-340696, filed Sep. 30, 2003, the entire contents of which are incorporated herein by reference.

BACKGROUND OF THE INVENTION

1. Field of the Invention

The present invention relates to an information recording apparatus and an information recording method for recording digitized content. More particularly, the present invention relates to an information recording apparatus and an information recording method, the apparatus comprising an illegal copy and reproduction preventing function for preventing stored content from being copied against an intention of a copyright owner or from being reproduced unlimitedly.

2. Description of the Related Art

As a method for applying restriction on reproduction to recorded information, in Jpn. Pat. Appln. KOKAI Publication No. 2001-195826 (Patent Document 1), there is disclosed a DVD equipment which records a pair of values in equipment incorporating flash memory and a DVD when information is recorded in the DVD and the recorded data can only be reproduced by the equipment which has carried out recording of the data.

In addition, in Jpn. Pat. Appln. KOKAI Publication No. 11-313282 (Patent Document 2), during recording, key data is generated on the basis of recording medium specific identification data and a de-scramble key, and the generated key data and scrambled data are recorded in a recording medium. During reproduction, the key data is decoded, and recovery of digital data is enabled if the recovered specific identification data and one's own specific identification data are equal to each other.

In addition, in Jpn. Pat. Appln. KOKAI Publication No. 11-630534 (Patent Document 3), when a digital broadcast is recorded, protection of a copyright is achieved by encoding and recording the equipment specific keys, keys for programs, and reproduction enable count. In Jpn. Pat. Appln. KOKAI Publication No. 11-213552 (Patent Document 4), a work key used for encoding AV data is encoded by using a disclosure key specific to an STB (set-top box), and the encoded work key is recorded together with the AV data. During reproduction, the encoded work key is recovered by using a secret key specific to STB so that reproduction can be carried out only by a system comprising the STB itself.

Further, in Jpn. Pat. Appln. KOKAI Publication No. 2003-22612 (Patent Document 5), there is disclosed a method of holding a key in recording equipment instead of a recording medium, and then, changing this key, thereby reliably eliminating the selected content on the recording medium.

Of the above patent documents, Documents 1 to 4 achieve reproduction caused by only the equipment which has carried out the recording, but fail to disclose a technique of efficiently eliminating one of the contents stored in each of the media detachable from a recording apparatus. In addition, as in a network hard disk drive having recording equipment and a plurality of recording media (HDD for example) connected to each other over a network, in the case where there is a possibility that the recording equipment and recording media are disconnected from each other or that power supplies of the recording media are turned on/off individually, there has been a problem that contents which are not required to be erased can be erased form media in an isolated state or in a power-off state.

In the above-described Jpn. Pat. Appln. KOKAI Publication No. 2003-22612 as well, in the case where a plurality of storage means exist independently of the equipment main body, if one of them is not connected or is powered off, updated information cannot be written with respect to the content recorded in that disk, and specific information contained in holding means does not coincide with information stored in the disk. As a result, there has been a problem that the content stored in that disk cannot be reproduced.

BRIEF SUMMARY OF THE INVENTION

According to an aspect of the present invention, there is provided an information recording apparatus for recording information in one or more storage devices for storing information, the apparatus comprising: a key storage unit configured to store a storage device key for encoding relating each of the one or more storage devices; a first generator unit configured to generate a storage device key which corresponds to a storage device specified in the one or more storage devices and store the device key in the key storage unit in the case where a content storing command has been input; a second generator unit configured to generate a title key which corresponds to input content; a first encoder unit configured to encode the title key by using the generated storage device key and store the encoded title key; and a second encoder unit configured to encode the input content by using the title key and store the encoded content in the specified storage device.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram depicting an embodiment in the case where an information recording apparatus according to the present invention is applied to a digital broadcast receiver 1;

DETAILED DESCRIPTION OF THE INVENTION

Figure 2:
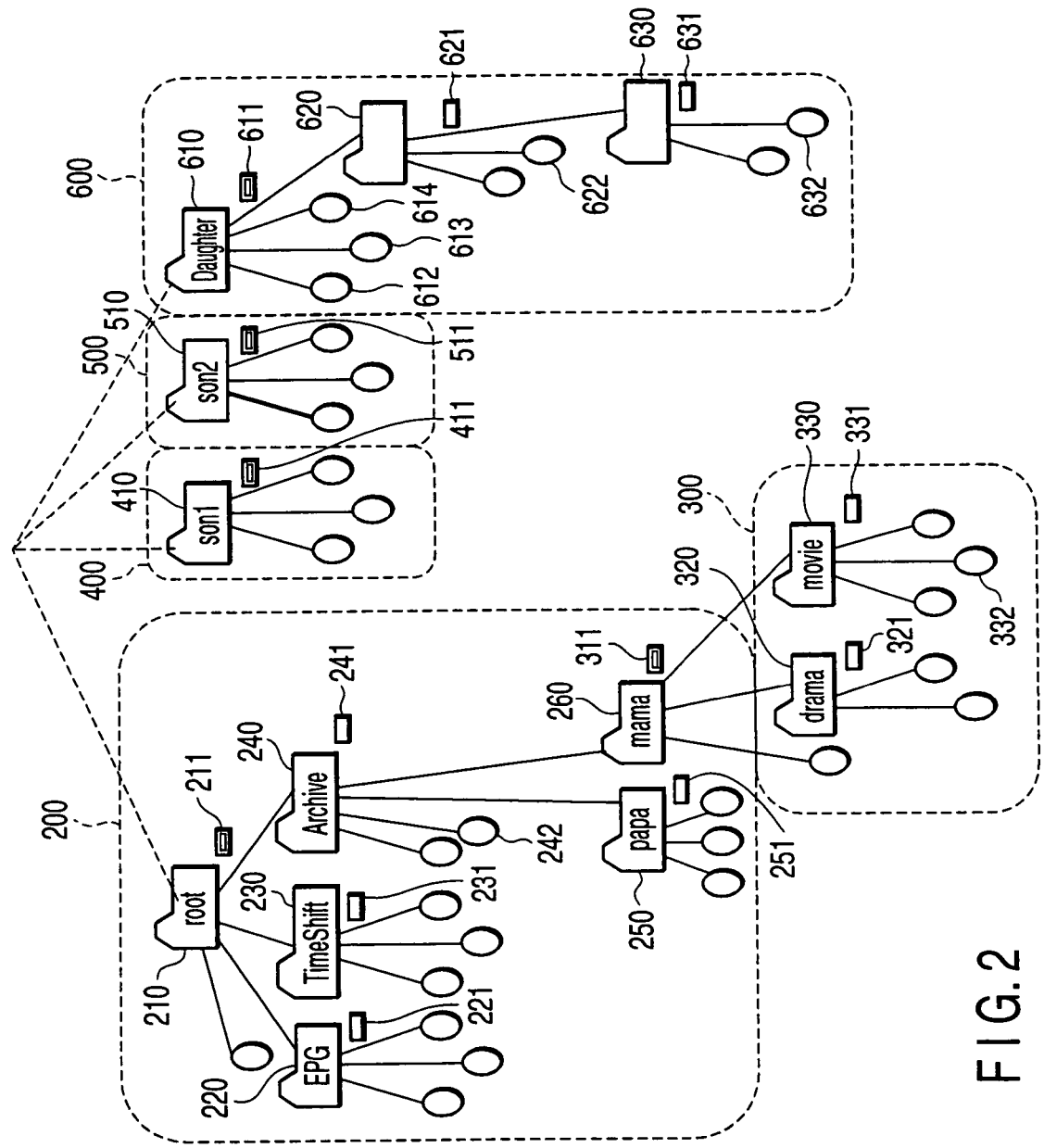
FIG. 2 is a view showing a hierarchical structure according to the present invention which is presumed in the case where content data is stored in a disk such as a hard disk or a DVD.

Hereinafter, embodiments of the present invention will be described in detail with reference to the accompanying drawings.

FIG. 1 is a block diagram showing an embodiment in the case where an information recording apparatus according to the present invention has been applied to a digital broadcast receiver 1.

In FIG. 1, a digital broadcast receiving signal received by an antenna (not shown) is supplied to a tuner 11 via an input terminal 11a, and channel selection is made here. An output of the tuner 11 is converted into a baseband digital signal at a demodulator 12, and one transport stream is output. The transport stream is such that content data such as a compressed video signal, a audio signal, or data (service information (SI)) indicating a configuration of these signals is packetized and is multiplexed.

A transport processor 13 extracts and outputs a required content signal from among the packetized and multiplexed signals of the transport stream demodulated by the demodulator 12. A video/audio decoder 14 decodes a video signal and a audio signal included in the content signal from the transport processor 13. The video and audio signals decoded by the video/audio decoder 14 are provided to a display device or a speaker (not shown) via an output terminal 14a, and then, the provided signals are reproduced.

An information recording apparatus 100 according to the present embodiment includes a CPU 15, a protection unit 16, and an interface (I/F) 17. To the information recording apparatus 100, storage media (information storage device) such as a plurality of hard disk drives (HDDs) 200, 300, 499, and 600, and a DVD drive 400 are connected via the interface 17. In this example, although one DVD drive is connected to the information recording apparatus 100, a plurality of DVD drives may be connected to the apparatus.

During information recording, the CPU 15 inputs the transport stream obtained by the demodulator 12 or by transport processor 13 via the protection unit 16. The thus input transport stream is recorded via the interface 17 in the HDD 200, 300, 500, or 600 or in DVD through the DVD drive 400. In addition, the CPU 15 may convert the transport stream output from the demodulator 12 into a program stream. The program stream may be recorded in an HDD or DVD, and then, the program stream may be processed in a recording, reproducing, copying or moving process instead of the transport stream.

During information reproduction, the CPU 15 reads out the transport stream from the HDD or from the DVD through DVD drive. The transport stream is provided to the transport processor 13 via the protection unit 16, and reproduction is carried out.

While in copying and moving, the information read out from the storage media can be output externally via a terminal 22. At this time, the information may be output via the transport processor 13 or may be output without intervening the transport processor as required.

In addition, the CPU 15 captures the transport stream from the demodulator 12 or transport stream processor 13, and the content information (service information such as title or copyright information) is discriminated. Based on a result of the discrimination, the CPU 15 controls the protection unit 16 to execute protection processing.

FIG. 2 shows a hierarchical structure according to one embodiment of the present invention which is presumed in the case where content data is stored in a disk such as a hard disk or a DVD. In FIG. 2, as shown in FIG. 1, the hard disk drives 200, 300, 500, and 600, and the disk drive 400 are shown.

In order to classify and store a variety of content data, contents are allocated such as a tree by using the concept of folder (also called directories). On the basis of a root folder 210, there are provided: an EPG folder 220 for storing EPG (electronic program guide) data; a file folder 230 for achieving a time shift function; and a folder 240 for storing a user specified program. Further, there are provided: folders 250, 260 for storing programs, namely, contents isolate on a user by user basis; and classification folders 320, 330 for classifying programs with respect to each of the users on a category by category basis. Furthermore, there are provided folders 410, 5510, 610 for each additional user; and a classification folder 620 for each additional user.

Each folder does not always exist on the same disk. Namely, with an increase of contents to be stored or with an increase of users, a disk may be added, and a folder may exist on such an added disk. In an embodiment shown in FIG. 2, the folders 210, 220, 230, 240, 250 and 260 exist on a disk in the disk drive 200; the folders 320 and 330 exist on a disk in the disk drive 300; the folder 410 exists on a disk in the disk drive 400; the folder 510 exists on a disk in the disk drive 500; and the folders 610 and 620 exist in a disk in the disk drive 600.

The folders 410, 510 and 610 are examples in an OS of an MS-DOS or an MS-Window system. Each disk drive can be discriminated due to a difference of drive letter such as "C:" or "D:". In the case of an OS of a UNIX system, even in a drive which is different depending on a mount concept, a file system is constructed so that the drive can be seen as one node in a directory tree. The root folder 210 and subsequent are hierarchical examples in the case of the OS of the UNIX system. The contents of the folder 260 in the disk drive 200 is stored in a disk in the disk drive 300. This example shows a state in which the disk drive 300 is mounted on, i.e., linked with the folder 260.

Drive key registers (key storage units) 211, 311, 411, 511 and 611 exist in the protection unit 16, as shown in FIG. 1, not on a disk. A drive key of the drive key register 211 also serves as a folder key of the folder 260. In addition, folder keys 221, 231, 241, 251, 321, 331, 621, 631 used for encoding the title keys contained in the folders and encoding the folder keys in the lower hierarchy thereof are provided for each folder. These folder keys may be stored in a disk or in the protection unit 16.

A hard disk drive and a DVD drive may be connected to the information recording apparatus 100 via a cable conforming to an IDE standard or may be connected via a network such as Ethernet. In such a connected disk drives, a user can freely connect or disconnect a connector provided for making connection to the information recording apparatus 100. A disk drive is not always powered on. In addition, only a drive required for reading or writing may be powered on. In addition, in the case of a DVD, even in the same drive, if one medium is replaced with another medium, it serves as a different disk.

Figure 3:
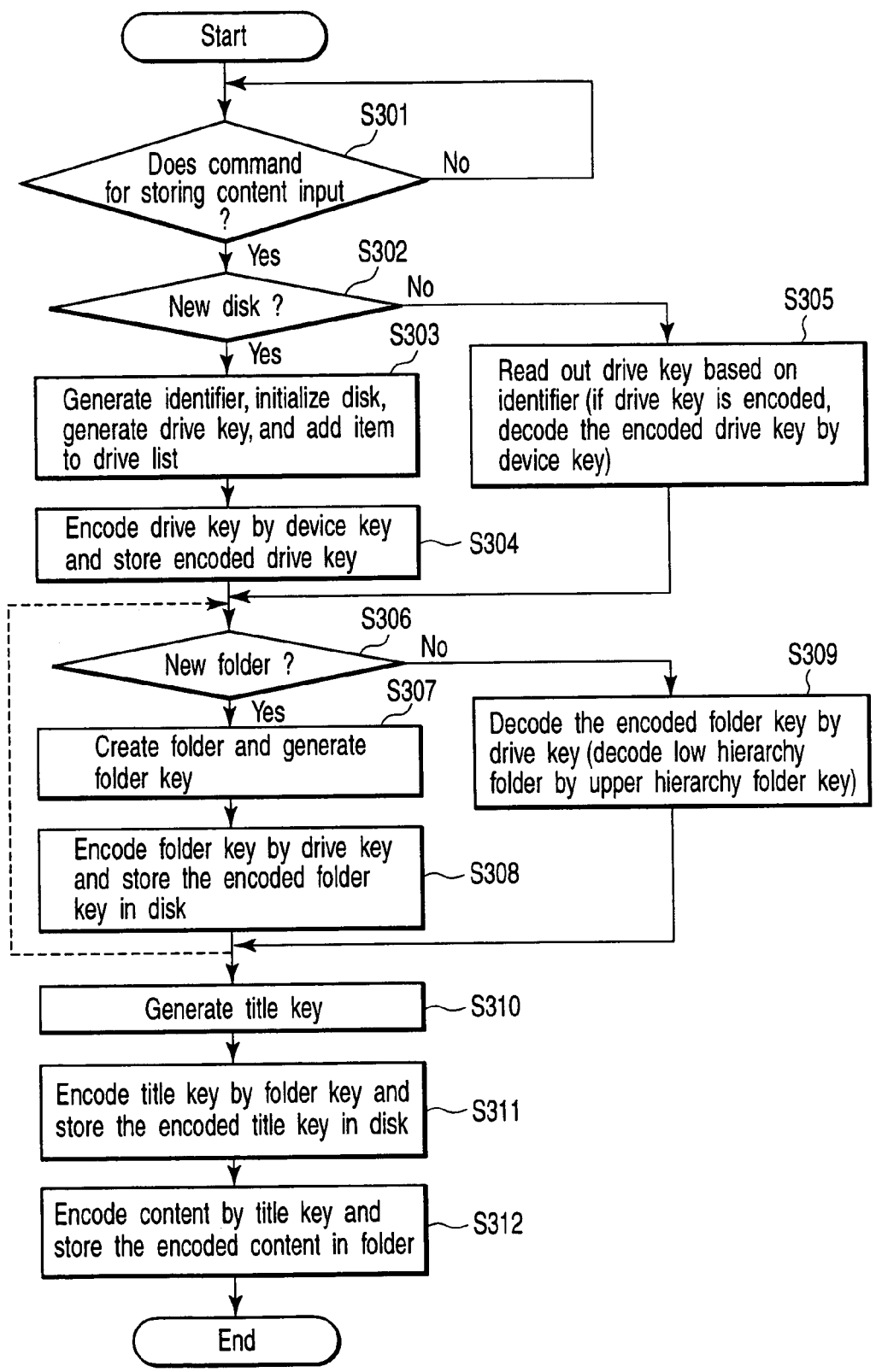
FIG. 3 is a flowchart showing an operation for storing content which require copyright protection.

Hereinafter, an operation for storing content according to the present invention will be described with respect to content requiring copyright protection. FIG. 3 is a flowchart showing such a storing operation. In the following description, the term "disk" implies a disk drive or a disk stored in the disk drive unless otherwise specified.

<S301>

The CPU 15 waits for a reproducing command from a user.

<S302>

When the user commands recording, it is determined whether or not the storage medium is a new disk. In the case of a hard disk, it is determined whether or not a new disk drive is used. In the case of a DVD, it is determined whether or not a new optical disk is used.

One method for determining whether or not a new disk is used includes identifying a file having specific regularity by writing it in a disk. For example, it is possible to determine that, if a file whose name is "diskid.txt" having a disk identification number stored therein, does not exist on a disk, the disk is a new disk, and that, if it does, the disk is a disk which has been used.

As another method, in the case of a hard disk, a volume name is read, and in the case of a DVD, a medium ID is read; and these identifiers are stored in a drive list, whereby it may be determined whether or not a new disk is used by checking whether these identifiers exist in the drive list. In the case of the DVD, a volume name of a DVD drive is common to any disk, and thus, discrimination of each medium cannot be made by determining the volume name. Therefore, in the case of the DVD, it is determined whether or not a new disk is used by reading a medium ID.

As another method, the determination may be made based on physical connection information on a disk drive. For example, determination may be made based on information such as IDE primary, secondary, master, slave, USB port, or SCSI ID, for example.

As still another method, in the case of a drive connected via a network, its IP address may be used for determination. In addition, as another method, in the case of the OS of the UNIX system, determination may be made by using drive mount information. In the MS-DOS or OS of the MS-Windows system, the determination may be made by a drive letter.

Any file system is featured in that a plurality of contents included in one folder are stored in one disk (however, the content included in the folder in the low hierarchy may be stored in another disk), and this feature can be utilized in such any file system. Namely, the fact that the contents in one folder are always stored in a single disk is utilized. Further, a different folder may be handled as a different disk.

Determination as to whether a drive is a hard disk or a DVD drive may be made by reading out information indicating a drive type from the drive.

Determination as to whether or not a new disk is used may be made by using a combination of the above methods.

<S303> and <S304>

In the case of a new disk, S303 is executed. For example, an identification number is generated, and identification number is written in the disk as "diskid.txt". In addition, an identifier such as a disk volume name or medium ID is added to a drive list 16L. Then, disk initialization is carried out, and a drive key (storage device key) is generated. The generated key is added to the drive list 16L such that the generated key is associated with a corresponding identifier. At this time, the drive key may be added to the drive list 16L by being encoded by a device key 16D. Further, it is desirable that the drive keys should be different each other depending on each hard disk and DVD.

Figures 4, 5:
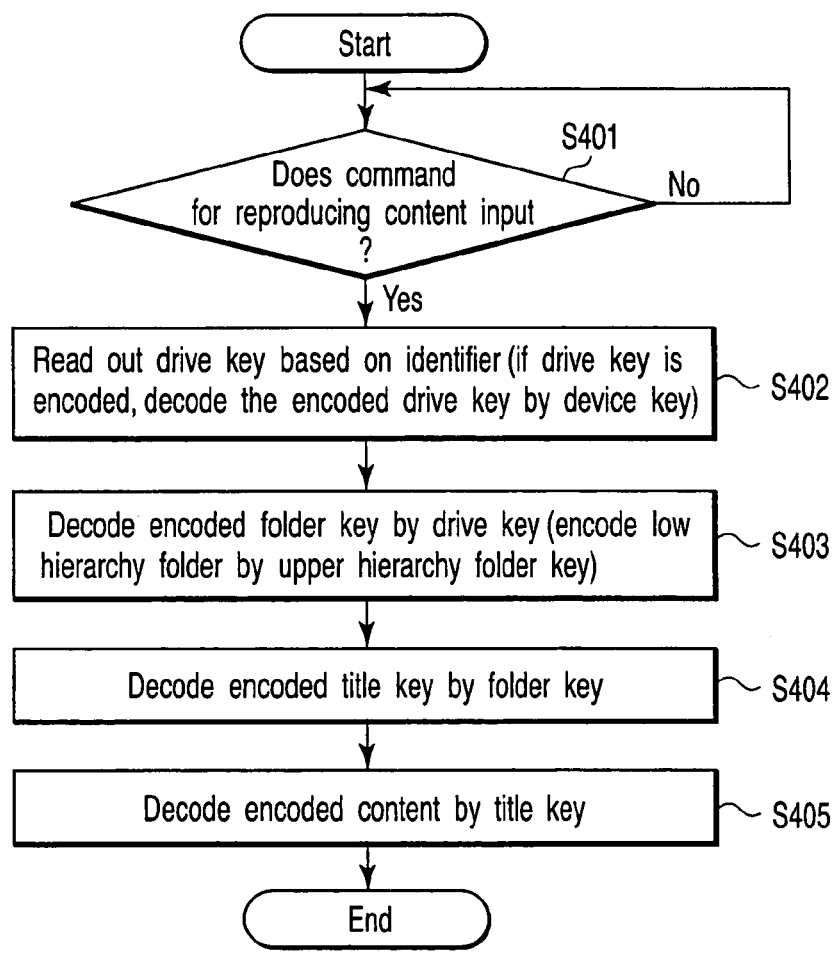
FIG. 4 is a view showing an example of a configuration of drive lists.
FIG. 5 is a flowchart showing an operation for reproducing stored content.

FIG. 4 shows an example of a configuration of a drive list. As shown in FIG. 4, in the drive list 16L, a drive key is allocated to a hard disk drive or DVD having made communication (connection) with the recording apparatus 100 on a medium by medium basis. Namely, one drive key is allocated to each hard disk drive or each DVD.

For example, in the case where the disk 600 is a new disk and a content to be stored are content 622, this drive key is stored in the drive key register 611 in the protection unit 16. In the case where the new disk is 300, the drive key is stored in the drive key register 311 in the protection unit 16. This drive key to be stored is a code associated with a medium identification number, a volume name, or a medium ID.

During storage, a drive key may be encoded by a device key 16D so that the encoding device key may be stored in, for example, the drive key register 311. In the case where a drive key is not encoded, no device key is required.

<S305>

In the case where no new disk is used, a drive key should have been allocated to that disk. A disk identifier such as "diskid.txt", a volume name, or a medium ID stored in the disk is read out, and disk identification is carried out. Further, referring to the drive list 16L, based on this disk identifier, a drive key corresponding to the disk is detected. As described above, one drive key is allocated to each hard disk drive or each DVD according to the drive list 16L. Therefore, even when a certain hard disk drive connected to the recording apparatus 100 is replaced with another hard disk or even when a DVD mounted on a DVD drive connected to the recording apparatus 100 is replaced with another DVD, the protection unit 16 can recognize such replacement.

The detected drive key is stored in a corresponding drive key register from among the drive key registers 211, 311, 411, 511 and 611 provided in the protection unit 16. In the case where that drive key is stored in the drive list 16L after encoded, the drive key is decoded by using the device key 16D, and the decoded drive key is stored in the drive key register.

<S306>

Next, as shown in S306, it is determined whether creation of a new folder is specified by a user or a content is stored in an existing folder. The content may be stored without creating a folder. In the case where the content is stored in a folder, a position of the content corresponds to, for example, that of the content 622 of the disk 600 or that of the content 322 of the disk 300. In the case where the content is stored without creating a folder, the position of the content corresponds to that of the content 613 of the disk 600. The folders 610, 510, 410 and the like are folders indicated in the disks for clarity. These folders are not actually provided on the disks, and are set at the side of the recording apparatus 100 in order for the recording apparatus 100 to manage the content stored in each disk.

For example, in the case where a content is stored like content 242 in the folder 240 which already exists in the disk 200, the content 242 should not be stored in a new disk. However, in the case where the folder 260 is newly created, and a content is stored in the folder 260, the content is stored in the disk 300. Therefore, at a time when the folder 260 is newly created, it may be determined that that folder 260 is a new disk and a drive key is generated and stored in the protection unit 16. Then, this drive key may be used as a folder key. In that case, information for identifying whether the drive key stored in the protection unit 16 is used as a folder key or whether the key 331 or the like possessed as a folder key is used is held in the protection unit 16 or the disk 200 or 300, and then, the information may be referred to during a reproducing or moving process and the like.

<S307>

For example, when the folder 620 is newly created in the disk 600 and a content is stored like the content 622, or when the folder 330 of the disk 300 is newly created and content is stored like the content 332, a folder is created as shown in S307, and then, a folder key is generated.

<S308>

The created folder key is encoded by a drive key. This encoded folder key may be stored in the disk.

<S309>

For example, when the folder 620 already exists in the disk 600 and the content 622 is stored therein or when the folder 330 of the disk 300 already exists, and the content 332 is stored therein, S309 is executed to decode the encoded folder key encoded by the drive key.

<S310>

Next, as shown in S310, a title key corresponding to a content to be stored is generated.

<S311>

Next, as shown in S311, the title key is encoded by the folder key, and the encoded title key is stored in the disk. The encoded title key may be stored in a folder concerned with the encoded title key or stored in a place other than the folder in the disk.

<S312>

Then, as shown in S312, the content is encoded by the title key, and the encoded content is stored in the folder.

Now, an operation for reproducing content in which no restriction is applied to reproduction enable count will be described in accordance with a flowchart shown in FIG. 5.

<S401>

The CPU 15 waits for a reproducing command from a user.

<S402>

A drive key should have already been allocated to a disk whose content is commanded to be reproduced. Thus, for example, "diskid.txt" stored in the disk is read out, and disk identification is carried out. In addition, referring to the drive list 16L, the corresponding drive key is detected from an identifier such as a volume name or a medium ID, and the detected drive key is stored in a corresponding drive key register. When that drive key is stored after encoded, the drive key is decoded by the device key, and then, the decoded drive key is stored in the drive key register. For example, when a content to be reproduced is stored in the disk 600, the detected drive key is stored in the drive key register 611 provided in the protection unit 16. When a content to be reproduced is stored in the disk 300, the detected drive key is stored in the drive key register 311 provided in the protection unit 16.

<S403>

When a content to be reproduced is, for example, content 613 of the disk 600, nothing is done in S403. When a content to be reproduced is content 622 of the disk 600, the encoded folder key 621 of the folder 620 including the content 622 is read out, and the read-out folder key is decoded by the drive key. The encoded folder key 621 may be stored in the disk 600.

When a content to be reproduced is content 632 of the disk 600, namely, when the folder 630 exists under the folder 620, and a content to be reproduced exists in the folder 630, and when the folder key 631 of the folder 630 is encoded by the folder key 621 of the folder 620, the encoded folder key 631 is decoded by the folder key 621.

When the folder key 631 of the folder 630 is encoded by a drive key stored in the drive key register 611, the encoded folder key 631 is decoded by that drive key.

When a content to be reproduced is content 332, namely, when the folder 330 further exists under the folder 260 and a content to be reproduced exists in the folder 330 and when the folder key 331 of the folder 330 is encoded by a drive key stored in the drive key register 311, the encoded folder key 331 is decoded by that drive key.

<S404>

When a content to be reproduced is, for example, content 613 of the disk 600, an encoded title key is decoded by a drive key read out from the drive key register 611. This encoded title key is a key stored in the disk 600 together with the corresponding content.

When a content to be reproduced is content 622 or content 632 of the disk 600, an encoded title key is decoded by the folder key 631. In addition, when a content to be reproduced is content 332 in the disk 300, the encoded title key is decoded by the folder key 331.

<S405>

Encoded content is decoded by the title key. The decoded content is reproduced via the transport processor 13 and the video/audio decoder unit 14.

Figure 6:
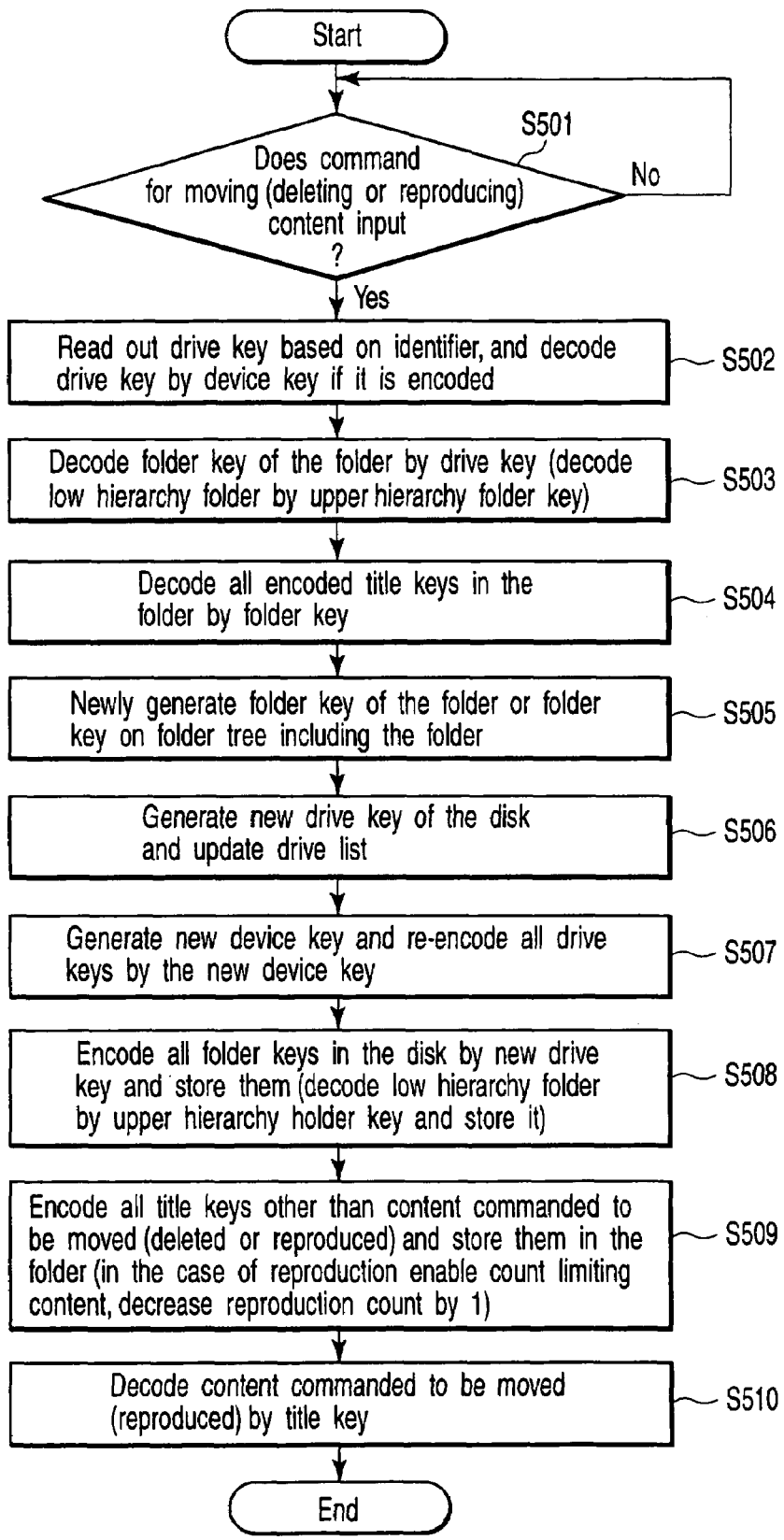
FIG. 6 is a flowchart illustrating an operation for moving (deleting or reproducing) content.

Now, an operation for moving and deleting a content and an operation for reproducing (copying) a content whose reproduction enable count is limited, according to the present invention will be described in accordance with a flowchart of FIG. 6 by way of example of the content stored in the disks 600 and 300.

Moving, deleting, and reproducing operations have common steps. Therefore, in the following description, the operation for moving content is mainly shown. The deleting and reproducing operations will be additionally described in the case where a step of these operations is different from that of the moving operation. In the case of the moving operation, content is reproduced, and the reproduced content is store in another medium. Reproduction of the original content must be disabled after the moving operation.

<S501>

The CPU 15 waits for a command for moving (deleting or reproducing) content from a user via a user interface (UIF) 23. The user interface 23 is an operating panel or a remote controller provided in the digital broadcast receiver 1.

<S502>

A drive key should have already been allocated to a disk whose content is commanded to be moved. Thus, referring to the drive list 16L, a drive key is detected from a disk volume name or a medium ID (identifier). The detected drive key is stored in a corresponding drive key register in the protecting unit 16. When that drive key is stored after encoded, the encoded drive key is decoded by a device key, and the decoded drive key is stored in a drive key register.

<S503>

A folder key of the folder including a content commanded to be moved (deleted or reproduced) is decoded by the drive key stored in the drive key register.

When the content commanded to be moved is, for example, content 613 of the disk 600, nothing is done in S503. When the content commanded to be moved is content 622, the encoded folder key 621 of the folder 620 including it is read out, and the read-out key is decoded by the drive key. The encoded folder key may be stored in the disk 600.

When the content commanded to be moved is content 632, namely, when the folder 630 further exists under the folder 620, and the content commanded to be moved exists in the folder and when the folder key 631 of the folder 630 is encoded by the folder key 621 of the folder 620, the encoded folder key 631 is decoded by the folder key 621. When the folder key 631 of the folder 630 has been decoded by the drive key stored in the drive key register 611, the encoded folder key 631 is decoded by the drive key.

When the content commanded to be moved is content 332, the encoded folder key 331 of the folder 330 including the content is read out, and the read-out folder key is decoded by a key stored in the drive key register 311. The encoded folder key 331 may be stored in the disk 300 or may be stored in the protection unit 16 without being encoded.

<S504>

All the encoded title keys in the folder including the content commanded to be moved (deleted or reproduced) are decoded by the folder key decoded in S503.

When the content commanded to be moved is content 613 of the disk 600, all the encoded title keys in the same folder hierarchy are decoded by the key read out from the drive key register 611. The encoded title keys in the same folder hierarchy as the content 613 indicate the encoded title keys of the content 612 and 614.

When the content commanded to be moved is content 622 or content 632, all the encoded title keys in the folder are decoded by the folder key 621 or 631.

When the content commanded to be moved is content 332 of the disk 300, all the encoded title keys in the folder 330 are decoded by the folder key 331.

<S505>

A folder key of the folder including the content commanded to be moved (deleted or reproduced), or the folder keys on a folder tree including the folder concerned is newly generated.

When the content commanded to be moved is content 632, a new folder key is generated with respect to the folder 630 and the folder 620.

In addition, when the content 622 has been commanded to be moved, a new folder key is generated with respect to the folder 620. When the content commanded to be moved is content 332 of the disk 300, a new folder key is generated with respect to the folder 330.

<S506>

Next, a new drive key of the disk including the content commanded to be moved (deleted or reproduced) is generated. The drive key of the drive concerned, stored in the drive list 16L is updated by the new drive key, and the new drive key is stored in the corresponding drive key register (611 or 311 for example) of the protection unit 16.

<S507>

The new drive key may be stored after being encoded by a device key or may be stored without being encoded. When the new drive key is encoded by the device key, a new device key is generated. The new drive key is encoded by using this new device key, and the encoded drive key is stored in the corresponding drive key register. When the drive key is not encoded, the device key does not need to be generated.

<S508>

All the folder keys in the disk including the content commanded to be moved (deleted or reproduced) are encoded by the new drive key generated in S506. The encoded folder key may be stored in the disk concerned. The folder key in the low hierarchy folder may be encoded by the folder key of the upper hierarchy folder or may be encoded by the drive key.

<S509>

All the title keys in the folder including the content commanded to be moved (deleted or reproduced), except the title key of the content commanded to be moved (deleted or reproduced), are encoded by the new folder key generated in S505. The encoded title keys may be stored in the disk concerned.

In this manner, the title keys of the content which is not commanded to be moved are encoded by the new folder key. As a result, the encoded title key is decoded by the above new folder key in response to the later moving or reproducing command, thereby making it possible to move or reproduce the content.

The title key of the content commanded to be moved is not encoded by the above new folder key. As a result, the title key cannot be decoded by the above new folder key in response to a later moving or reproducing command, thereby making it impossible to move or reproduce the content.

It is noted that, when a content, whose reproduction enable count is limited and the reproduction enable count is set to 2 or more, is reproduced, instead of moving the content, the reproduction enable count is decreased by 1. The title key of such content is encoded by the new folder key like the above content which is not commanded to be moved. As a result, the title key of such content is decoded by the new folder key in response to the later reproducing command, thereby making it possible to reproduce such content.

Further, the title key of a content whose reproduction enable count is 1 is not encoded by the new folder key like the above content which is commanded to be moved. As a result, the title key of such content cannot be decoded by the new folder key in response to a later reproducing command, thereby making it impossible to reproduce the content.

<S510>

The content commanded to be moved (reproduced) is decoded by the title key decoded in S504. The decoded content is supplied to the transport processor 13. The content may be output to the outside together with the title key without being decoded. When deletion of the content has been commanded, nothing is done in this step.

Assume a case of moving a specific content stored in the disk 600 of the plurality of disks 200, 300, 400, 500 and 600 which have been stored with content. In this case, a new drive key is generated with respect to only the disk 600, and the generated drive key is stored in the drive list 16L. After movement of the specific content, contents other than the specific content in the disk 600 can be reproduced by using the new generated drive key. Namely, in a disk including the moved content, with respect to contents which are not to be moved, title keys are encoded by a new folder key, and the new folder key is encoded by a new drive key. Then, the encoded title key and encoded folder key are stored in the disk, and the new drive key is stored in the drive list 16L of the recording apparatus 100. After movement, a content other than the content which has been moved can be correctly decoded by using the new drive key and new folder key.

In this movement of the content, a change relating to the disk 200, 300, 400 and 500 other than the disk 600 does not occur. Therefore, during this movement, for example, even when the disk 200 is not connected or power is not turned on, the contents stored in the disk 200 can be reproduced by using a drive key of the disk 200 which is not subject to change before and after the movement. In this manner, according to the present invention, the contents stored in a disk other than a disk subjected to the content moving process can be prevented from disabling reproduction.

In addition, according to the present invention, a folder key for decoding the title key of the moved content is changed, and the folder key is encoded by a new drive key which cannot be backed up by a disk. Further, the drive keys are set to specific to each HDD and each DVD, and the set drive keys are stored in the drive list 16L of the recording apparatus 100. Assume a case in which a content enabled for one time reproduction is stored in a DVD-RW for example, by means of the recording apparatus 100, and the content is backed up in another optical disk or HDD by means of another recording apparatus. In such a case, even if an attempt is made to illegally reproduce the backed-up content by mean of the another recording apparatus, such a reproduction is impossible. Because, the new drive key can not be backed up in the DVD-RW.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording apparatus for recording information in one or more storage devices for storing information, the apparatus comprising:
    a key storage unit configured to store a storage device key for encoding relating each of the one or more storage devices;
    a first generator unit configured to generate a storage device key which corresponds to a storage device specified in the one or more storage devices and store the device key in the key storage unit in the case where a content storing command has been input;
    a second generator unit configured to generate a title key which corresponds to input content;
    a first encoder unit configured to encode the title key by using the generated storage device key and store the encoded title key;
    a second encoder unit configured to encode the input content by using the title key and store the encoded content in the specified storage device;
    a generator unit configured to generate a folder for storing the input content in the specific storage device and generate a folder key which corresponds to the folder;
    a third encoder unit configured to encode the folder key by using the generated storage device key and store the encoded folder key;
    a fourth encoder unit configured to encode the title key by using the folder key and store the encoded title key; and
    a storing unit configured to store the encoded content in the generated folder.

2. An information recording apparatus according to claim 1, further comprising:
    a storage device list configured to register a storage device which has made communication with the information recording apparatus and a storage device key of the storage device;
    a readout unit configured to, when a command for moving specific content has been input, read out from the storage device list a specific storage device key which corresponds to a specific storage device having stored therein the specific content in the one or more storage devices, and decode encoded title keys of all content included in the specific storage device by using the specific storage device key;
    an update unit configured to update the specific storage device key stored in the storage device list to a new storage device key; and
    a third encoder unit configured to encode a title key other than the title key of the specific content by the new storage device key in the specific storage device.

3. An information recording apparatus for recording information in one or more storage devices for storing information, the apparatus comprising:
    a key storage unit configured to store a storage device key for encoding relating each of the one or more storage devices;
    a first generator unit configured to generate a storage device key which corresponds to a storage device specified in the one or more storage devices and store the device key in the key storage unit in the case where a content storing command has been input;
    a second generator unit configured to generate a title key which corresponds to input content;
    a first encoder unit configured to encode the title key by using the generated storage device key and store the encoded title key;
    a second encoder unit configured to encode the input content by using the title key and store the encoded content in the specified storage device;
    a generator unit configured to generate a folder for storing the input content in the specific storage device and generate a folder key which corresponds to the folder;
    a third encoder unit configured to encode the folder key by using the generated storage device key and store the encoded folder key;
    a fourth encoder unit configured to encode the title key by using the folder key and store the encoded title key;
    a storage device list configured to register a storage device which has made communication with the information recording apparatus and a storage device key of the storage device;
    a first decoder unit configured to, when a command for moving specific content has been input, decode an encoded folder key of a specific folder having the specific content stored therein;
    a second decoder unit configured to decode encoded title keys of all content included in the specific folder by using the decoded folder key;
    a first update unit configured to update the decoded folder key of the specific folder to a new folder key;
    a second update unit configured to update the specific storage device key stored in the storage device list to a new storage device key;
    a fifth encoder unit configured to encode the new folder key by the new storage device key; and
    a sixth encoder unit configured to encode a title key other than the content commanded to be moved in the specific folder by the new folder key.

4. An information recording method for recording information in one or more storage devices for storing information, the method comprising:
    when a command for storing content has been input, generating a storage device key which corresponds to a storage device specified in the one or more storage device;
    storing the generated storage device key in a key storage unit configured to store a storage device key for encoding relating each of the one or more storage devices;
    generating a title key which corresponds to input content;
    encoding the title key by using the generated storage device key, and storing the encoded title key;
    encoding the input content by using the title key, and storing the encoded content in the specified storage device;
    creating a folder for storing the input content in the specific storage device, and generating a folder key which corresponds to the folder;
    encoding the folder key by using the generated storage device key, and storing the encoded folder key;

encoding the title key by using the folder key, and storing the encoded title key; and storing the encoded content in the created folder.

5. A digital broadcast receiver, comprising:

a tuner configured to receive a digital broadcast signal and select a channel;

a demodulator configured to convert a broadcast signal channel-selected by the tuner to a baseband digital signal and provide a transport stream;

a transport processor configured to extract and provide a required content signal from among the transport streams provided from the demodulator;

a decoder configured to decode a video signal and a audio signal included in the content signals provided from the transport processor;

an information recording apparatus for recording information in one or more storage devices for storing information, the information recording apparatus including:

(a) a key storage unit configured to store a storage device key for encoding relating to each of the one or more storage devices;

(b) a first generator unit configured to, when a command for storing a content has been input, generate a storage device key which corresponds to a specified storage device in the one or more storage devices and store the generated key in the key storage unit;

(c) a second generator unit configured to generate a title key which corresponds to input content;

(d) a first encoder unit configured to encode the title key by using the generated storage device key and store the encoded title key;

(e) a second encoder unit configured to encode the input content by using the title key and store the encoded content in the specified storage device;

(f) a generator unit configured to generate a folder for storing the input content in the specific storage device and generate a folder key which corresponds to the folder;

(g) a third encoder unit configured to encode the folder key by using the generated storage device key and store the encoded folder key;

(h) a fourth encoder unit configured to encode the title key by using the folder key and store the encoded title key; and (i) a storing unit configured to store the encoded content in the generated folder.

* * * * *